No. 758,665. PATENTED MAY 3, 1904.
R. E. KIMBALL.
APPARATUS FOR HULLING RICE.
APPLICATION FILED MAR. 12, 1903.
NO MODEL.
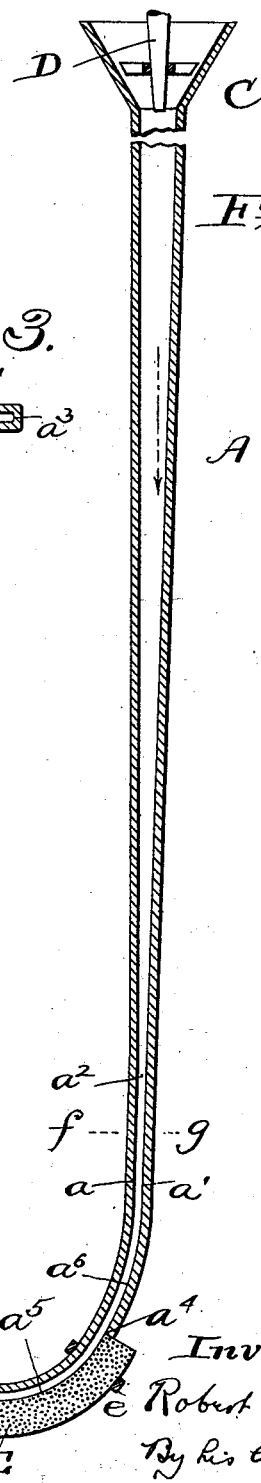
Witnesses
E. B. Gilchrist
N. L. Drennan
Inventor
Robert E. Kimball
By his Attorneys,
Thurston & Bates No. 758,665. Patented May 3, 1904.

UNITED STATES PATENT OFFICE.

ROBERT E. KIMBALL, OF CLEVELAND, OHIO, ASSIGNOR OF TWO-THIRDS TO L. H. WEBB AND E. L. THURSTON, OF CLEVELAND, OHIO.

APPARATUS FOR HULLING RICE.

SPECIFICATION forming part of Letters Patent No. 758,665, dated May 3, 1904.

Application filed March 12, 1903. Serial No. 147,400. (No model.)

*To all whom it may concern:*

Be it known that I, ROBERT E. KIMBALL, a citizen of the United States, residing at Cleveland, in the county of Cuyahoga and State of Ohio, have invented a certain new and useful Improvement in Apparatus for Hulling Rice, of which the following is a full, clear, and exact description, reference being had to the accompanying drawings.

This invention relates to an apparatus adapted for use in practicing a process for hulling rice, which forms the subject-matter of an application filed November 11, 1902, and numbered 130,893.

Most of the rice grown in the United States is hulled as rice has been hulled for many years—to wit, between the old-fashioned millstones. Even with the rice most easily milled not over seventy per cent. of the rice is hulled by one passage between the stones, and with some kinds of rice it is very much less; but the most serious difficulty attendant upon the use of such stones is that they break a very large proportion of the rice-kernels from which the hulls are removed. In recent years rice-hulling machines have been devised and some of such machines have been put to use. The extent of the breakage in milling by the processes and apparatus heretofore employed is indicated by the following statement quoted from the United States Census Bulletin No. 201, June 21, 1902, page 13, viz: "This arbitrary grading of rice according to size and luster without regard to quality makes breakage in milling a serious problem for both producer and miller. When a grain breaks, it loses a large percentage of its commercial value, though its food value is unchanged. * * * The annual loss in the commercial value of the rice crop [of the United States] on account of the difference in price between whole and broken rice has been estimated by the United States Department of Agriculture (Bulletin No. 22, 1899) at about two million dollars."

The difficulties which have been encountered by those who have sought to devise ricehulling mechanism grow out of these facts, viz: that the rice-kernels are very brittle, the hulls are tough and elastic, and the hull-covered kernels are of various sizes.

The primary object of this invention is to very greatly reduce the loss in the value of the rice due to breakage in hulling.

Another object is to reduce the cost of the hulling process and to increase the rapidity with which it can be accomplished.

By the use of the apparatus shown in the drawings for the practice of the process above referred to, as hereinafter set forth, a very large proportion of the rice may be hulled by a single treatment, while the percentage of rice broken during the operation will be so small that it will be practically negligible.

The invention may be here summarized as consisting of the combination of parts shown and described herein, and pointed out definitely in the claims.

In the drawings, Figure 1 is a sectional side view of the invention; Fig. 2, a front view thereof—that is, a view looking from the left side of Fig. 1. Fig. 3 is a transverse sectional view on the line of $f g$ of Fig. 1.

The apparatus as shown includes a tube A, having a flaring hopper-shaped upper end C. A nozzle D extends down through the hopper and is positioned so as to discharge its blast of air axially down the tube. This tube at and near its upper end may be cylindrical or of any other form; but at a considerable distance above the retarding-surface $a^5$, to be hereinafter described, the tube becomes substantially rectangular in cross-section, having what for convenience may be called a "front wall" $a$, a "rear wall" $a'$, and two "sides" $a^2 a^3$. The rear wall, or at least the greater part of it, inclines very gradually toward the front wall, so that it crosses the line of the air-blast (indicated by the arrow in Fig. 1) at a very acute angle at a substantial distance above the frictional retarding-surface $a^5$. At a very short distance below the point where this rear wall so crosses the line of the air-blast the distance between the front and rear walls is preferably only a little greater than the thickness of one of the rice-covered kernels, and thereafter these two walls substantially preserve this relationship. The lower part of the rear wall has a concave inner surface, which in the best construction is of gradually-increasing curvature to the discharge end of the tube. This concave surface from about the point indicated by $a^4$ is of such character that it will frictionally retard the hull-covered rice-kernels, which are caused to slide upon it. Preferably this surface is a carborundum surface; but it may be made of emery or stone or vulcanized rubber or any other suitable material having the necessary qualities. This retarding-surface is indicated by $a^5$. Above this retarding-surface the inner surface $a^6$ of the rear wall is smooth, so that a hull-covered rice-kernel may slide freely thereon. The lower part of this smooth surface may be and in the best construction is slightly curved inwardly; but in any event the retarding-surface is concave and must be a practical continuation of said smooth surface. The tube is very long, the intermediate portion being broken out in the drawings. The purpose of this length is to allow the rice time to become accelerated by the air-blast to a very high velocity. The actual length of the tube and the force of the blast will vary greatly with different conditions of service; but I may say simply by way of illustration that I have successfully employed a tube one inch in diameter at its upper portion and fifteen feet long with an air-blast of about thirty pounds to the square inch. The preferred form of this apparatus, as shown in the drawings, from its resemblance in shape to a letter J, may be conveniently characterized as a "J-shaped" tube whose lower curved portion presents an interior frictional retarding-surface.

When this device is in service, the hull-covered rice-kernels are fed into the hopper C and an air-blast is blown with considerable force into the tube. These rice-kernels are carried along by the blast against the smooth inwardly-inclined surface of the rear wall, but at such acute angles thereto that there is practically no tendency for such kernels to rebound and no liability whatever that the kernels will be cracked or broken by the impact. The inertia of the rice causes it to slide upon this smooth surface as it is propelled along by the air-blast. The described disposition of said surface relative to the direction of the air-blast will if the tube is wide enough laterally to accommodate all the rice which the blast is carrying along cause the rice to spread itself out upon said surface in a single-thick stream, so that each rice-kernel will necessarily slide upon this smooth surface. This latter result is also insured by the nearness of the front and rear walls, the same being only such a distance apart as will permit a single-thick stream of rice to pass. These hull-covered rice-kernels sliding rapidly along this smooth surface will be carried onto the frictional retarding-surface $a^5$; but when they strike this surface the forward movement of the hull is suddenly checked, wherefore the inclosed kernel, by reason of its inertia, presses outwardly upon the hull and splits the same and escapes therefrom. The frictional retarding-surface must not present any projections against which the kernels may strike, because such projections when the kernels strike them would tend to break the kernels, and the projections would also, if they did not break the kernels, tend to so retard them, as well as the hulls, whereby the purpose of the apparatus would be to that extent defeated. It is evident therefore that the surface $a^5$ cannot be a corrugated surface in a practical apparatus. The ideal surface is one having only sufficient roughness to impose the necessary frictional retarding influence upon the hulls and having the necessary hardness to withstand the wear. The best construction is that in which the rear wall of the tube is formed of a block E of carborundum, which is removably held in place by straps $e$ or some or other suitable means.

Having described my invention, I claim—

1. In an apparatus for hulling rice, a tube whose rear wall inclines inward and crosses the line of the air-blast at an acute angle, and has at its lower end a frictional retarding-surface, and above that a smooth surface of which the retarding-surface is a practical continuation, combined with means for forcing an air-blast down through said tube.

2. In an apparatus for hulling rice, a tube whose rear wall inclines inward and crosses the line of the air-blast at an acute angle, and has, for a distance, a smooth inner surface, and, below that, a concave frictional retarding-surface which is a practical continuation of said smooth surface, combined with a nozzle introduced into the upper end of said tube for directing an air-blast through said tube.

3. In an apparatus for hulling rice, a tube whose rear wall inclines inward, and has, for a distance a smooth inner surface, and, below that, a concave frictional retarding-surface of increasing curvature toward the outlet end, which retarding-surface is a practical continuation of said smooth surface, combined with a nozzle for injecting an air-blast down through said tube.

4. In an apparatus for hulling rice, a tube having a hopper-shaped upper end, and a rear wall which inclines inward and crosses the line of the air-blast at an acute angle, and has, for a distance, a smooth inner surface, and, below that, a concave frictional retarding-surface of increasing curvature toward the outlet end, which retarding-surface is a practical continuation of said smooth surface, combined with a nozzle for injecting an air-blast into the upper end of said tube.

5. In an apparatus for hulling rice, a tube, the lower part of which is flattened and widened in cross-section, presenting a rear wall which has a smooth inner surface for a distance, and, below that, a concave frictional retarding-surface which is a practical continuation of said smooth surface, combined with means for directing an air-blast down through said tube.

6. In an apparatus for hulling rice, a tube the lower part of which is approximately rectangular in cross-section, and has a rear wall which inclines inward and crosses the line of the air-blast at an acute angle, and has a smooth inner surface for a distance, and, below that, a concave frictional retarding-surface which is a practical continuation of said smooth surface, the part of the front wall of said tube which opposes said retarding-surface and a part of said smooth surface, being separated from the rear wall a distance only a little greater than the thickness of the hull-covered rice-kernels to be treated, combined with means for directing an air-blast in the upper part of said tube.

7. In an apparatus for hulling rice, a tube having a hopper-shaped upper end, which tube is, or becomes, of approximately rectangular form in cross-section at a suitable distance below said hopper, and has a rear wall which is inclined inward across the line of the air-blast at an acute angle and toward the opposed wall, thereby lessening the distance between them, which tube is of gradually-increasing width in that part thereof where the distance between the front and rear walls is gradually decreasing, said rear wall having a smooth surface and, below that, a concave frictional retarding-surface which is practically a continuation of said smooth surface, combined with means for directing an air-blast into the upper end of said tube.

8. In an apparatus for hulling rice, a long tube having a hopper-shaped upper end, and a substantially flat smooth rear wall, and having also below such smooth surface and as a practical continuation thereof, a concave surface rough enough to frictionally retard the berries without projecting in front of the rice-kernels within the hulls, combined with an air-blast nozzle projecting into the upper end of said tube through the hopper-shaped upper end thereof, substantially as and for the purpose specified.

9. In an apparatus for hulling rice, a tube having an open upper end for the introduction of the rice, and a smooth rear wall which crosses the line of the air-blast at an acute angle, and having, below such smooth surface and as a practical continuation thereof, a concave frictional retarding-surface, combined with means for forcing a rapid air-blast down through said tube, substantially as and for the purpose specified.

10. An apparatus for hulling rice comprising a tube having a smooth interior surface and also beyond such surface a frictional retarding-surface which is a practical continuation of the smooth surface, the wall of the tube opposing the frictional retarding-surface being close enough to it to prevent the berries turning over endwise, combined with means for directing an air-blast into said tube.

11. An apparatus for hulling rice comprising a tube whose lower portion is flattened and widened and deflected and which has a bottom wall on such widened and deflected portion presenting an interior frictional retarding-surface.

12. A rice-hulling apparatus comprising a J-shaped tube whose lower curved portion presents an interior frictional retarding-surface.

13. A rice-hulling apparatus comprising a J-shaped tube whose curved portion is flattened and widened and has on its lower interior wall a frictional retarding-surface.

In testimony whereof I hereunto affix my signature in the presence of two witnesses.

ROBERT E. KIMBALL.

Witnesses:
E. B. GILCHRIST,
E. L. THURSTON.